United States Patent Office 2,712,811
Patented July 12, 1955

2,712,811

POULTRY LITTER

George W. Dowell, Jr., Salem, Ill., assignor to Dowell Products Incorporated, McLean, Va., a firm No Drawing. Application December 17, 1953,
Serial No. 398,873

3 Claims. (Cl. 119—1)

This invention relates to animal husbandry and more particularly to the provision of a novel litter for poultry.

Under present day practices suitable vegetable matter, such as straw, or the like, is employed for the production of litters in poultry houses. Litters of this character are in widespread use in this industry despite the serious inadequacies of the materials employed for the formation thereof. Primarily, straw and/or related vegetable matter is far from sanitary for the purposes intended, since the material is edible and thus invites the presence of numerous insects which, in turn, bring with them parasites of various descriptions. Poultry droppings added to the situation inherently present, compound the unsanitary conditions and, in effect, the litter becomes a breeding place for parasites which then are carried by the birds and also taken internally since the nature of litters of this character is inviting to poultry and the birds will pick at such material. In this manner, unless extreme care is exercised and litters changed frequently, disease will be spread through the poultry houses with serious financial losses to breeders.

Accordingly, it is a major purpose of the present invention to provide a novel poultry litter which will overcome the prior art insufficiencies as discussed hereabove.

It is a further object of the invention to provide a novel poultry litter which, by reason of the inherent nature of the material employed, will be relatively sanitary.

It is a further object of the invention to provide a novel poultry litter produced from material particularly suited for such purposes and which is inherently repellent to the vast majority of insects, parasites, or the like, which are attracted to vegetable matter.

It is a still further object of the invention to provide a novel poultry litter produced from material which is inherently unpalatable to poultry whereby the possibility of such poultry picking at the litter or consuming bits thereof is effectively obviated.

It is a further object of the present invention to provide a novel poultry litter produced from material having a water-soluble aromatic content with disinfectant characteristics releasable upon the addition of moisture, as through poultry droppings, or the like.

It is a still further object of the present invention to provide a novel poultry litter produced from material so conformed that the litter cannot bed down or become matted but will remain in a fluid condition subject to continuous agitation through movement of poultry thereupon.

Further objects and advantages of the invention will be apparent from the following description of the novel poultry litter with which we are here concerned as well as the novel method of production thereof.

Briefly stated, the invention comprises the use of tobacco stems for the production of poultry litters. Such waste material is relatively inexpensive, being generally employed for the recovery of nicotine and for use as a fertilizer or as an insecticide in dust form.

The stem particles are substantially cylindrical, vary in length through relatively large limits, and have an average diameter of slightly in excess of one-sixteenth of an inch. Desirably, relatively short particles of tobacco stems are employed for the production of the poultry litter of the present invention, such particles varying in length from one half inch to an inch and a half, as will be discussed more fully hereinafter. Such material, even when cleaned, dried and graded as contemplated herein, gives off a gentle aroma of nicotine thereby improving sanitary conditions within the poultry houses. The stems per se are repellent to insect life and will not harbor the forms of parasites to be found around poultry houses. Such parasites include lice, mites, and the like, all of which seriously affect the life and laying habits of poultry.

Clean, uninfected birds pick up weight more rapidly and lay eggs with greater regularity. Thus, the present material is also especially suited for nesting purposes and cleaner eggs are gathered in poultry houses where such nests are provided.

As stated, the litter gives off a clean, mild tobacco aroma by reason of the natural nicotine content of the stems. Poultry parasites and parasitic organisms cannot thrive in free nicotine and the litter will remain free from infestation despite relatively protracted use or infrequent changing thereof. Additionally, the pungent odors generally present in poultry houses are virtually eliminated through the use of this litter material.

A relatively thin layer of tobacco stems comprises a highly adequate poultry litter. The material, by reason of the cylindrical nature of the particles thereof, cannot become matted and the movement of the bird's feet thereupon will cause a constant shifting of the stem particles. Since the aromatic nicotine content is 49° water soluble, poultry droppings will provide sufficient moisture for the continuous release of free nicotine. In addition, the absorption of moisture from such droppings will increase the weight of certain stem particles which will gravitate to the lower level of the litter through the agitation thereof by movement of poultry, thus bringing dry stem particles to the upper surface. On such lower level these dampened stem particles will have adequate opportunity to dry and thus reach a comparable weight so as to again enter into the cycle of shifting stem particles comprising the upper surface of the litter.

Moreover, the stem particles are unpalatable to poultry; thus, there will be no picking and/or consuming of litter material which, through normal use, will have become contaminated by poultry droppings.

The method of manufacture or production of the material of the instant poultry litter includes the following steps: Tobacco stems are taken from a suitable source of supply (generally a manufactory engaged in the production of smoking and chewing tobacco, etc.) and such stems include tobacco hands, sweepings, and other waste materials which may or may not have been contaminated to render it unfit for human use. Such contamination, generally by slaked lime, is an accepted trade practice but has no bearing on the suitability of the material for the purposes intended. The stem material is then put through a thrashing process which breaks up the stems, removing leaf particles therefrom.

The combined thrashed material is then put through a cyclone dust collector where dust and fine leaf particles are removed. This by-product of the present process is not waste but is recovered and used as a crop dusting material or enters in other appropriate channels of trade.

The tobacco stems or residue is then screened, a screen having a one inch mesh having been found to be admirably suited for such purposes, and the larger particles are collected and kiln dried. Preferably a continuous process is employed, the stem particles having a ten minute path of travel through a kiln employing temperatures between 200° and 300° F. The dried tobacco stem particles are then collected and are suitable for use as the intended litter material. During this heat-drying treatment, any insect life present is destroyed and the litter material is thus rendered sterile.

It has been found in practice that stem particles varying from one half inch to one inch and one half are best suited for present purposes. Since the stem particles are inherently cylindrical in conformation, larger particles may well pass through a single screening step. Accordingly, a second screening process may be employed to assure a greater uniformity of finished product. The finished material is uniformly light brown in color and presents a highly attractive appearance when employed for the purposes intended.

There has thus been described a novel poulty litter, and the process for producing such material, which is repellent to parasitic insects, which will remain sanitary during continued use, which will continuously release an aromatic material having insecticidal characteristics, which is unpalatable to poultry, which has an admirable consistency obviating any possibility of matting or bedding down, which may be produced economically from readily available and inexpensive materials, and which requires neither skilled labor nor costly equipment for the production thereof.

It will be obvious to those skilled in this art that various changes may be made in the invention without departing from the spirit and scope thereof and therefore the invention is not considered restricted by that which is described in the specification but only as indicated in the appended claims.

What is claimed is:

1. Poultry litter material comprising relatively short particles of tobacco stems having a cylindrical formation, the length of said particles being on the order of one-half inch to one and one-half inches.

2. Poultry litter material comprising relatively short particles of vegetable matter having a cylindrical formation and having a naturally contained water soluble insecticidal content, the length of said particles being on the order of one-half inch to one and one-half inches.

3. Poultry litter material comprising relatively short particles of tobacco stems having substantially cylindrical formations, the length of said particles being not substantially greater than one and one-half inches.

References Cited in the file of this patent

UNITED STATES PATENTS

| | | |
|---|---|---|
| 2,014,900 | Lapp | Sept. 17, 1935 |
| 2,179,591 | Godchaux | Nov. 14, 1939 |
| 2,345,779 | Wagner | Apr. 4, 1944 |
| 2,376,672 | Dreyling | May 22, 1945 |
| 2,477,892 | Paquette | Aug. 2, 1949 |